Dec. 3, 1968　　　　K. H. MILLER　　　　3,414,766
POWER CONTROL CIRCUIT
Filed Oct. 19, 1965　　　　　　　　　　　2 Sheets-Sheet 1

INVENTOR
Kenneth H. Miller
BY Thomas G. Harwood
ATTORNEY

Dec. 3, 1968 K. H. MILLER 3,414,766
POWER CONTROL CIRCUIT
Filed Oct. 19, 1965 2 Sheets-Sheet 2

INVENTOR
Kenneth H. Miller
BY Thomas A. Harwood
ATTORNEY

United States Patent Office

3,414,766
Patented Dec. 3, 1968

3,414,766
POWER CONTROL CIRCUIT
Kenneth H. Miller, 1607 Westmoore,
Austin, Tex. 78723
Filed Oct. 19, 1965, Ser. No. 497,885
22 Claims. (Cl. 315—194)

ABSTRACT OF THE DISCLOSURE

A circuit for controlling electrical power supplied to a load from an A.C. voltage source, particularly for incandescent lamp loads, comprises electronic switch means, control means having a capacitor which is charged for producing a signal when discharged to control the conduction of the switch means, and another electronic switch means for preventing the recharging of the capacitor during the remainder of the half cycle of the A.C. voltage during which it is discharged.

---

Many types of lighting applications require selectively controllable dimmers so that the intensity of the lamps may be varied at will. As one example only, proper stage lighting requires the use of suitable dimmers to control the intensity of the lamps to give various effects, wherein many other applications will readily come to mind. In regards to this particular area of power control, there has been a substantial effort in the innovation of electronic circuitry to accomplish the desired objects, especially since the advent of solid-state switching devices, such as the semiconductor controlled rectifier, for example. This type of device, and other similar devices, allows phase control of the power supplied to the lamp load. That is to say, the electronic solid-state switch is switched on at any desired time within the alternating supply current half cycle, wherein more or less power is supplied to the lamp load as the device is switched on earlier or later, respectively, in the half cycle.

There are a number of problems that have arisen, or have been discovered, in the provision of suitable dimming circuitry for lighting control in particular. One of these problems is the provision of a dimmer that has an isolated low voltage or D.C. control circuit which controls the alternating electrical power to the load through a power circuit, wherein the control circuit and power circuit are electrically isolated insofar as any substantial amount of electrical power is concerned. The necessity of this becomes apparent when considering the danger element of an operator in physical contact with a control circuit which is directly connected electrically to or forms a part of the power circuit. Of more importance than this, however, is the expediency of being able to gang together a plurality of dimmers which can be controlled or driven from multiple-controlled inputs without creating direct power shorts between the control circuits, all of which is desirable in stage lighting control and other elaborate dimmer installations. It is with respect to this general type of dimmer circuit that the present invention is directed.

The advantage in using semiconductor controlled rectifiers or other solid-state power switches, rather than more conventional means, will be readily apparent to those skilled in the art, and consequently, the present invention utilizes such devices for this purpose. However, several problems are presented in the provision of a dimmer circuit which includes a control circuit for controllably gating or switching solid-state power switches while maintaining the control circuit isolated from the power circuit. It will be recognized, of course, that since the solid-state switches are controlled as a function of the phase of the alternating supply current, the control circuit must be electrically associated in some way with the power circuit to maintain the proper phase relationship between the two circuits. In one type of arrangement, an isolation transformer can be connected directly across the solid-state power switches in order to sense the phase of the alternating supply current and to apply this to the control circuit. To do this, the voltage of a secondary of the isolation transformer is rectified to give some sort of D.C. voltage, normally at a voltage level much below that of line voltage, which is applied to the control circuit. In using the transformer primary connected directly across the power switches, voltage is made available to the control circuit from the transformer secondary during that first portion of the alternating supply current half cycle until the power switch is fired, at which time the voltage collapses because of the short circuit presented by the switch. This is a suitable arrangement except for the transformer characteristics and the possibility of the power switches failing to fire properly. It has been found as a common characteristic of isolation transformers that the voltage derived from the secondary is not necessarily the same in one half cycle as in the other half cycle because of the non-linearity of the transformer. When using two solid-state power switches, such as semi-conductor controlled rectifiers, to control the power to a lamp load by switching the two rectifiers on at controlled times during the two respective half-cycles of the alternating current source to achieve full wave power control, the different secondary voltage of the isolation transformer in the two respective half cycles will cause the two controlled rectifiers to fire at different times during the respective half cycles. This causes a D.C. component to be generated or produced in the transformer primary which accentuates this problem in the firing of the rectifiers at different times in the two respective half cycles. Moreover, should one of the controlled rectifiers fail to fire for several cycles during its respective half cycle, this will cause a substantial D.C. voltage to be produced in the primary of the isolation transformer and can very readily cause the transformer to burn up or be damaged. Thus the entire problem revolves about the fact that the isolation transformer primary is connected directly across the solid-state switches so that voltage is made available to the control circuit only during that portion of the half cycle when the solid-state switch is in a high impedance state, whereas the voltage on the transformer secondary collapses once the switch has fired. It is therefore one object of the invention to eliminate this problem while still utilizing an isolation transformer to associate the power and control circuits.

According to the above object, the dimmer circuit of the invention utilizes an isolation transformer with the primary thereof connected directly across the power lines so that voltage is always available in the control circuit from the secondary of the transformer and does not collapse upon the firing or switching of one of the solid-state power switches. Thus the problem is eliminated insofar as any substantial D.C. component being produced in the transformer primary which would cause it to burn up.

Considering now the control circuit, a suitable trigger circuit must be utilized therein for firing or switching the solid-state power switches within the power circuit, whereby the trigger circuit is associated with the secondary voltage from the isolation transformer to maintain the proper phase relationship between the power and control circuits. If semiconductor controlled rectifiers are used as the power switches in the power circuit, it is particularly advantageous to use a unijunction transistor and capacitor combination as the means by which the semiconductor controlled rectifiers are triggered. This particular trigger circuit is commonly known and used, wherein one advantage in the use thereof lies in the fact that this type of trigger circuit gives a very precise firing time and can be very accurately controlled. The operation of this trigger circuit is to provide a charge on the capacitor through a charging circuit over a predetermined period of time as determined by the time constant of the charging circuit to bulid up a voltage on the capacitor sufficient to fire the unijunction transistor, at which time the charge on the capacitor is dumped through the unijunction transistor to provide a voltage pulse for being applied to the gates of the semiconductor controlled rectifiers. As just stated, the trigger circuit must be associated with the secondary voltage of the isolation transformer to maintain the proper phase relationship, and in effect, the charging capacitor within the trigger circuit is charged in respnose to the secondary voltage. In the instance where the primary of the isolation transformer is connected directly across the controlled rectifiers in the power circuit, voltage will be made available to the control circuit for charging the capacitor through the transformer secondary only during that part of the half cycle of the alternating current source when the electronic switch is in the high impedance state. Once the switch is fired or triggered to its low impedance state, the voltage collapse on the secondary of the isolation transformer and the capacitor can no longer charge, and thus the trigger circuit is essentially deactivated during the remainder of that half cycle. However, when the primary of isolation transformer is connected directly across the alternating current source lines so that voltage is available to the control circuit from the transformer secondary during the entire half cycle, as in the case of the present invention, the charging capacitor within the trigger circuit can recharge during the remainder of the half cycle after one of the controlled rectifiers has been fired. This is undesirable since the capacitor within the trigger circuit will be charged to some voltage at the beginning of the next half cycle and thus will not require as great a time to attain the firing voltage for the trigger circuit as for the preceding half cycle. Thus at least one problem in connecting the transformer primary directly across the alternating current source lines is apparent, and it is another object of the invention to provide a circuit utilizing this particular connecton while preventing the charging capacitor within the trigger circuit from recharging during the remainder of the half cycle after it has once been discharged. In other words, it is an object to provide means for essentially deactivating at least this part of the control circuit once power has been switched to the lamp load during a half cycle, which means will maintain the control circuit in this so-called deactivated state until the start of the next half cycle.

The means within the control circuit which supplies the charging current for the capacitor within the trigger circuit is very important in that the rate of voltage rise on this capacitor is what determines the time from the beginning of a half cycle when a power switch is fired. In other words, the charging current must be very accurately controllable. It is common to use the collector current of a transistor to provide the charging current, wherein the conduction of this transistor is controlled by an isolated D.C. source and the magnitude of the D.C. source is controlled by an operator. The circuit of the invention utilizes this scheme. However, should there be wide fluctuations in the ambient temperature surrounding the dimmer, the base-emitter junction voltage $V_{BE}$ of the transistor will vary with the temperature and accordingly cause variations in the conection thereof. This will obviously cause fluctuations in the charging rate of the capacitor to cause the intensity of the lamp load to vary accordingly, all of which is undesirable. Therefore, it is another object of the invention to eliminate this undesirable effect by providing temperature compensation for the transistor or other means which supply the charging current for the capacitor within the trigger circuit.

An isolated control circuit of the type described using a transistor or other device to supply the charging current for a capictor in a trigger circuit utilizes voltage derived from the isolation transformer as the supply for the transistor to maintain the proper phase relationship between the alternating supply current and the charging current. As a result, the transistor will always have some bias applied thereto which have a tendency to cause the transistor to conduct some amount of current even though the isolated D.C. control source is cut completely off. This is undesirable when the operator wishes to completely cut off the supply current to the lamp load, since erratic flickering of the lamps will occur as the transistor current gradually charges the capacitor to the required triggering voltage. Thus is is yet another object to provide another clamping means to completely deactivate the control circuit when the isolated D.C. control source is cut off.

The functional relationship between the percentage of the maximum D.C. control voltage applied by the operator and the percentage of maximum intensity of the lamps as controlled thereby is very important, especially in stage lighting and other applications where the intensity of the light as it affects the eye is critical. It is known that the intensity effect of light on the eye and the actual intensity of the light striking the eye do not bear a linear relationship with each other. As a result, the Society of Illuminating Engineers has set forth a standard for light dimmers in which the intensity of the lamps controlled by the dimmer will vary nonlinearly with a corresponding linear variation of the D.C. control voltage, so that as the D.C. control voltage is varied linearly, the actual effect on the eye of the lamp intensity will vary linearly, even though the lamps are not actually varying linearly in intensity themselves. In particular, the lamp intensity must be caused to vary as a square of the percentage change in the control voltage, which has been denoted as the square law curve by the Society of Illuminating Engineers and which is also variously referred to as the dimmer "tracking" this curve. Utilizing a dimmer circuit of the type noted above in which a unijunction transistor and charging capacitor combination are used as a trigger to fire the solid-state control switches, and utilizing a transistor or other semiconductor device to supply the charging current for the trigger capacitor, has presented certain difficulties in this so-called "tracking" to result in a lamp intensity versus D.C. control voltage relationship which matches that of the standard curve. At very low current levels, the lamp intensity will vary proportional to the square of the RMS current applied thereto, and thus there should be a linear relationship in the variation in D.C. control voltage and the time during the half cycle at which the solid-state power switches are triggered. This implies a linear operation of the semiconductor devices (and all associated circuitry) within the control circuit as a function of D.C. control voltage. However, as more power is supplied to the lamps, the filaments heat sufficiently to cause the resistance thereof to change greatly. Thus the intensity of the lamps no longer is a function of the square of the RMS current. By experimentation, the devices within the control circuit (in particular, the transistor providing the charging current for the trigger circuit) can be biased in such a manner that "tracking" is provided up to about 75% of the maximum D.C. control voltage input. However, as the control voltage is increased over the last 25% to its maximum, the firing circuit will not advance enough toward the beginning of the half cycle to cause the lamp intensity to increase according to the square law. Rather, the lamp intensity tends to vary linearly therewith. Thus it is yet another object of the invention to provide means for providing "tracking" over the entire range of variation of the D.V. control voltage. Stated more broadly, it is an object to provide a dimmer circuit of the type described in which the lamp intensity varies as a square of the percentage increase in the control voltage and follows this standard curve very closely all the way from zero to 100% of the control voltage, which gives the proper control by switching the power control switches in the power circuit anywhere in the half cycle of the alternating current source.

The utilization of solid-state power switches, such as semiconductor controlled rectifiers, to switch electrical power through a lamp load also presents a serious problem when cold lamps are initially turned on, or in the event of overloading of the power circuit. It is known that the peak currents conducted by the solid-state switches is critical in that if the peak current exceeds a predetermined maximum value, the solid-state power switches will be destroyed. Thus it is yet another object of the invention to provide an overload protection for the solid-state power switches to maintain the peak current below a predetermined maximum level at all times. Further, it is another object to provide an overload protection means of this type which causes the phasing back of the firing of the solid-state power switches to a point later in the half cycle to maintain the peak current below the predetermined maximum, even to the point of completely preventing the switches from firing, should this be necessary.

In accordance with the above objects of the invention, there is provided a dimmer circuit utilizing solid-state power devices for controllably switching power through a lamp load which comprises a control circuit electrically isolated from the power circuit, which control circuit controls the power supplied to the load in response to the control of an isolated D.C. power source. The control circuit is maintained in the proper phase relationship with the alternating current source by deriving voltage from the secondary of an isolation transformer connected at its primary directly across the alternating power source. The invention, in a preferred embodiment thereof, utilizes the combination of a unijunction transistor-charging capacitor combination for firing a pair of semiconductor controlled rectifiers connected in series with the load to selectively control the power supplied to the load during each half cycle of the alternating power source, thus providing full wave power control. Since the initial charge on the capacitor at the beginning of a half cycle of the alternating power source determines the time during this cycle at which the controlled rectifiers are fired, the invention incorporates a suitable clamping means to preclude the capacitor from charging during that remaining portion of the half cycle once it has been discharged to prevent the erroneous firing of the controlled rectifier power switches. In one embodiment, another semiconductor controlled rectifier is utilized in the control circuit for being switched on at the same time either of the power controller rectifiers is switched on to clamp the control circuit and to prevent the capacitor from recharging during the remaining portion of the half cycle. Because the charge on the charging capacitor within the trigger circuit is critical in determining when the power control switches are fired during the half cycle of the alternating power source, it is highly desirable that the charge on this capacitor be exactly zero at the very beginning of each half cycle. Although means are provided in the clamping funtcion just described for preventing the capacitor from further charging during the remaining portion of the half-cycle once it has been discharged, there is a possibility of leaving some small charge on this capacitor when no D.C. control voltage input is applied, which will build up over several cycles and cause erratic firing of the controlled rectifiers, and thus erratic flickering of the lamps. To eliminate this, the invention provides, in another embodiment thereof, a charging network which insures that the capacitor will charge up to a voltage sufficient to fire the unijunction transistor, thus discharging the capacitor, exactly at the end of each half cycle, or just prior thereto, which will not allow the controlled rectifiers to supply power to the lamps even though the capacitor tends to be charged by some other means.

In the preferred embodiment of the invention, a transistor is utilized at the means for supplying the charging current to the capacitor within the trigger circuit, and to eliminate any variation of intensity of the lamps as a function of ambient temperature variations affecting this control transistor, temperature compensating means is provided. This takes the form, in a preferred embodiment, of a diode connected to the control terminal of this transistor in which the voltage thereacross varies exactly as does the base-emitter junction voltage of the transistor to maintain the conduction of the transistor constant with constant D.C. control input voltage, regardless of temperature variations. In order to insure that this control transistor is turned off and supplies no charge to the charging capacitor when the D.C. control voltage is cut off, means are provided for clamping the control transistor to zero conduction when the control voltage is cut off. In one embodiment, this takes the form of another transistor which is caused to conduct and short the base to the emitter of the control transistor when the D.C. control voltage is turned off, which clamping transistor will itself be turned off when the D.C. control voltage is set at any value above zero and thus allow the proper conduction of the control transistor.

To provide the proper "tracking" function and cause the lamp intensity to vary as a square function of the percentage increase of the isolated D.C. control voltage, there is provided means for causing the trigger circuit to fire the controlled rectifiers in the power circuit soon enough during each half cycle to affect this relationship throughout the complete range of the D.C. control voltage. In one embodiment, this is accomplished by using the series combination of a resistor and Zener diode connected in parallel with the D.C. control voltage and the control transistor which supplies current to the charging capacitor, which Zener diode breaks down at a predetermined voltage level to decrease the impedance between the control voltage and the control transistor so as to cause it to conduct more heavily. This causes the trigger circuit to fire earlier during the half cycle than it normally would as a function of a linear increase in the control voltage. The breakdown voltage of the Zener diode is selected at a magnitude of about 75% of the control voltage to provide this function at the range where it is required. Additional series Zener diode-resistor combinations can be connected in parallel with the first-mentioned combination, which Zener diodes will have successfully higher breakdown voltages, to cause a successive reduction in impedance as a function of successive increases in D.C. control voltage.

The overload protection circuit comprises a circuit for generating a voltage proportional to the peak value of the supply current, which voltage will remain constant at a value proportional to the maximum safe peak current. In one embodiment, this comprises the use of a current transformer having a primary current winding and a secondary voltage winding coupled into a full wave rectifier for charging a capacitor. When the votlage on the capacitor reaches the value proportional to the maximum safe peak value in current, a Zener diode is caused to break down and supply current to retard the firing of the controlled rectifiers in the respective half cycles of the alternating power source. As the peak current increases above the maximum safe level, more current is supplied through the Zener diode to further retard the firing of the controlled rectifier during the half cycle. This retarding effect is accomplished by reducing the bias on the control transistor supplying charging current to the capacitor within the trigger circuit.

Many other objects, features and advantages of the present invention will become readily apparent from the following detailed description thereof when taken in conjunction with the appended claims and the attached drawing in which:

Figure 1:
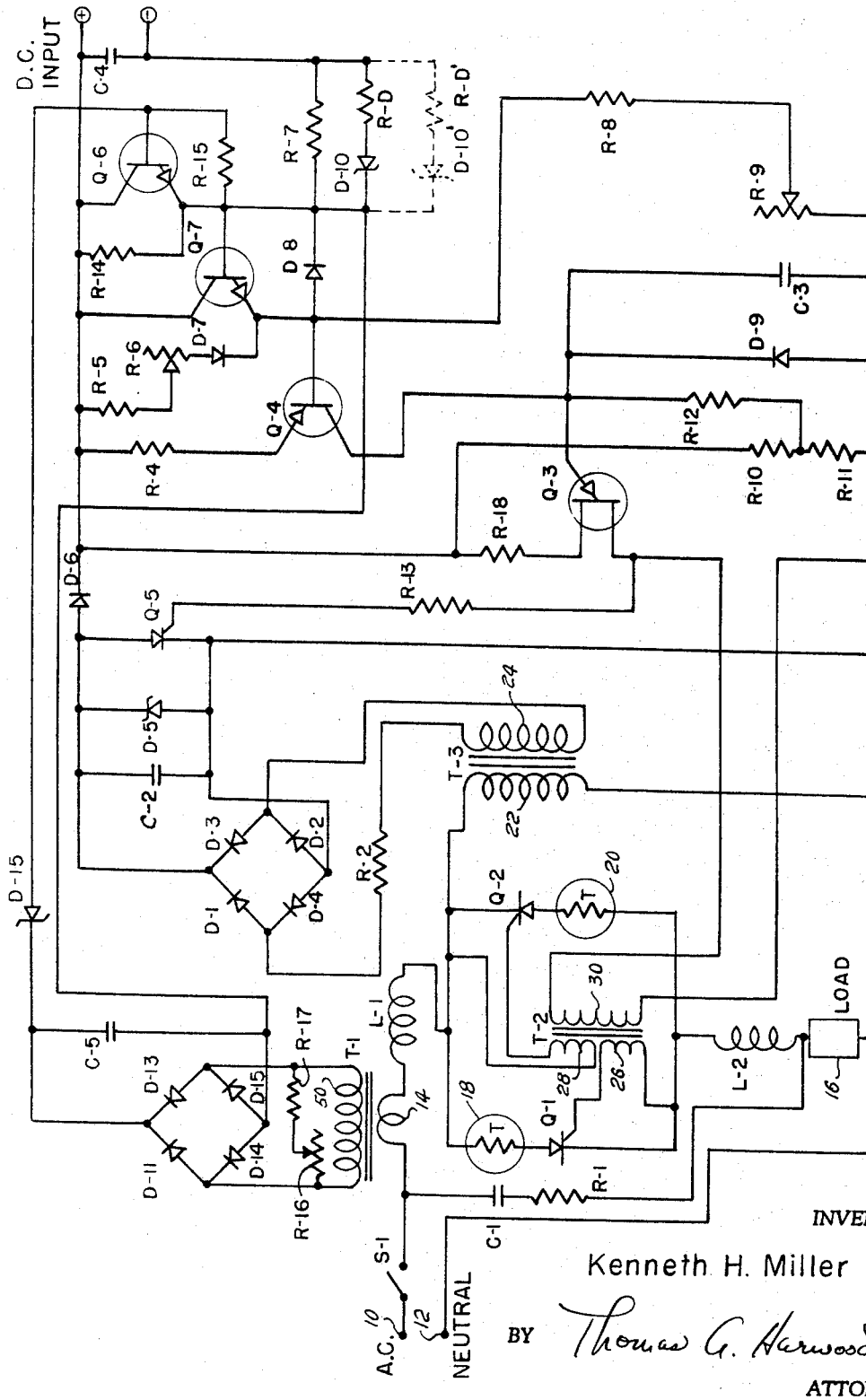
FIGURE 1 is an electrical schematic diagram of a preferred embodiment of the invention incorporating all of the features noted above.

Referring now to FIGURE 1, a lamp load 16 is connected in series with and supplied from an alternating current source, and a pair of semiconductor controlled rectifiers Q–1 and Q–2 are connected in series with the load and source. The controlled rectifiers are connected in parallel with each other in opposite polarity to provide full wave power control to the lamp, wherein this combination and the load are connected in series with each other and with the alternating current source between A.C. terminal 10 and neutral terminal 12. Also connected in series with the load and semiconductor controlled rectifiers are two radio frequency suppressing chokes L–1 and L–2, the primary 14 of transformer T–1 and circuit breaker S–1. Transformer T–1 is used to detect the peak current in the power circuit and will be described in detail later, but it will be noted at this time that the primary 14 is a current winding and has no appreciable impedance effect on the power circuit. Connected across the controlled rectifiers is a capacitor C–1 in series with a resistor R–1, which serves to suppress radio frequency interference generated by the switching of the semiconductor controlled rectifiers. Connected in series with the controlled rectifier Q–1 is a thermistor 18 for limiting the current flow through the rectifier until the thermister has been heated sufficiently to lower its resistance. Similarly, thermistor 20 is connected in series with controlled rectifier Q–2. These thermistors are used to limit the inrush current through the controlled rectifiers when power is initially switched into lamps having cold filaments, wherein these current limiting devices are optional and form no part of the invention. A first secondary 26 of another transformer T–2 is connected between the gate and cathode of controlled rectifier Q–1, and another secondary 28 of the same transformer is connected between the gate and cathode of controlled rectifier Q–2. Voltage pulses for causing the controlled rectifiers to switch to the low impedance state are generated in the secondaries 26 and 28 responsive to a voltage pulse applied to the primary 30 of the transformer, all of which will be described later. As is well known, a semiconductor controlled rectifier is a device that presents a very high impedance between its anode and cathode in a state of nonconduction and can be switched to a stable, low impedance state by applying a gating voltage or signal to the gate thereof in the presence of a positive voltage applied to the anode with respect to the cathode. Once it switches to the low impedance state, it will remain in that condition regardless of the gate signal until the current through the device decreases below a level called the holding current. Thus in the circuit being described, the switching on of a controlled rectifier at any time during one half cycle of the alternating current source will insure that it will remain on during the remainder of that half cycle. Since a semiconductor controlled rectifier is a unidirectionally conducting device, another controlled rectifier must be utilized in opposite polarity thereto to give full wave power control.

The foregoing is a description of the power circuit of the dimmer, wherein the control circuit will now be described. The primary 22 of an isolation transformer T–3 is connected directly across the alternating power source. It will be noted that this primary is not connected directly across the controlled rectifiers, in which case the voltage on this primary would collapse each time either of the controlled rectifiers is switched to its low impedance state. In this case, voltage is available on the primary of the isolation transformer at all times when the A.C. supply voltage is available.

Figure 2:
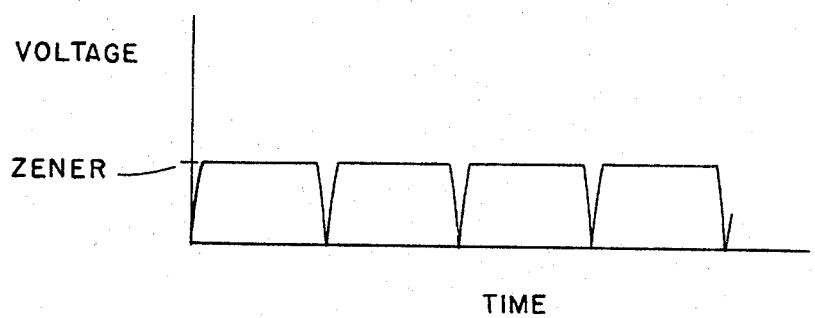
FIGURE 2 is a graphical representation of the voltage supplied to the control circuit from the power circuit by means of an isolation transformer rectified by a full wave rectifier bridge, and clamped by a Zener diode.

Transformer T–3 is an isolation transformer for providing to the control circuit an alternating voltage of the same phase as the supply current, which is necessary so that the control circuit operates in phase with the alternating current being supplied to the load. That is to say, the controlled rectifiers are switched on at various times during each half cycle of the alternating current source so that the load will be supplied with power during the remainder of that half cycle, and thus the control circuit to be described must operate in phase with the alternating current source in order to switch on the controlled rectifiers at the proper time. The secondary 24 of the isolation transformer is connected through current limiting resistor R–2 into a full wave rectifier bridge consisting of diodes D–1, D–2, D–3 and D–4, so that diodes D–1 and D–2 conduct during one half cycle and diodes D–3 and D–4 conduct during the other half cycle. Thus a full wave rectified voltage is provided with the positive polarity being established at the interconnection of diodes D–1 and D–3. Connected across the output of the full wave rectifier bridge are capacitor C–2, Zener diode D–5 and another semiconductor controlled rectifier Q–5, the operation of the latter of which will be described later. Capacitor C–2 acts as a filter, and Zener diode D–5 is characterized to break down at a fairly low voltage, such as about 20 volts, to clip the alternating full wave rectifier sine wave voltage to provide voltage pulses as depicted in the graphical representation of FIGURE 2. This voltage is similar to a series of square waves in that the voltage is substantially constant throughout virtually all of the half cycle, although there is a short rise and decay time as governed by the sine wave. This voltage is then applied to the rest of the control circuit through blocking diode D–6. To provide pulses as shown in FIGURE 2 which approximate a square wave, the secondary to primary turns ratio of transformer T–3 is desirably at least 1:1 and can be made 2:1 or higher to provide faster rise and decay times of the pulses.

The advantage in using a unijunction transistor-capacitor combination as the firing or trigger circuit for the semiconductor controlled rectifiers in the power circuit has been mentioned above and is used in the control circuit of this dimmer. This triggering circuit comprises a capacitor C–3 connected at one terminal to the emitter of a unijunction transistor Q–3 and at the other terminal to a reference potential as established on the negative side of the full wave rectifier bridge comprising diodes D–1, D–2, D–3 and D–4. The unijunction transistor is connected at one base through a resistor R–18 to the cathode of diode D–6, which is the positive voltage side of the full wave rectifier bridge, and at the other base to the reference potential just mentioned through primary 30 of transformer T–2. Resistor R–18 provides temperature control to unijunction transistor Q–3 as is commonly known. It is also commonly known that as capacitor C–3 charges up to a sufficient voltage, it will cause the unijunction transistor Q–3 to fire and dump the charge on the capacitor through the emitter and base thereof to provide a voltage pulse. This pulse is applied to the primary 30 of the transformer T–2 so that a voltage pulse will be established on the secondaries 26 and 28 thereof to trigger the controlled rectifiers. To provide accurate control of the power delivered to the load, the semiconductor controlled rectifiers Q–1 and Q–2 must be switched exactly at the desired time during each half cycle, respectively, of the alternating current source, and thus it is apparent that the charging rate of capacitor C–3 is important in determining the time from the beginning of each half cycle when the voltage attained thereon is sufficient to actuate unijunction transistor Q–3. It is also apparent that in order to precisely control the triggering of the controlled rectifiers, the charge on capacitor C–3 should be at exactly zero at the very beginning of each half cycle. To provide a selectively controllable charging current to capacitor C–3, a transistor Q–4 is connected at its emitter to the cathode of diode D–6 through an emitter bias resistor R–4 and at the collector to the interconnection of capacitor C-3 and the emitter of unijunction transistor Q-3. Hence, the charging rate of capacitor C-3 is governed by the collector current of transistor Q-4. Furthermore, since transistor Q-4 is powered from the full wave rectified voltage derived from the power circuit, which voltage is reduced to zero on the emitter of transistor Q-4 at the end of each half cycle, capacitor C-3 is charged in phase with the alternating current source so that the controlled rectifiers in the power circuit are triggered at the proper time during each half cycle.

An isolated D.C. control voltage (not shown), which can be derived from any suitable source, is used to control the conduction of transistor Q-4, whereby the D.C. control voltage is applied between terminals 40 and 42 as shown. Positive terminal 40 is connected directly to the positive side of the full wave rectifier bridge at the cathode of diode D-6, and the negative terminal 42 is connected to the base of transistor Q-4 through blocking diode D-8 and bias resistor R-7. A capacitor C-4 is connected across the D.C. input terminals 40 and 42 to eliminate or short out any alternating voltage that may be present in the D.C. control voltage. The D.C. control voltage is variable by the operator between zero and a predetermined maximum amount. In the event that this voltage is set at zero, no bias will be applied to transistor Q-4, and therefore, no charging current will be supplied to capacitor C-3 from transistor Q-4 except as provided by resistors R-10, R-11 and R-12 as will be explained hereinafter. Consequently, no triggering pulse will be delivered to either of the semiconductor controlled rectifiers during any part of either half cycle. As the D.C. input voltage is increased, diode D-8 is caused to conduct and the bias on transistor Q-4 is increased to cause an increasing current to be supplied to capacitor C-3. Setting of the D.C. control voltage at any given constant magnitude will cause transistor Q-4 to conduct with a constant collector current during substantially the entire half cycle of voltage each pulse as shown in the graphical representation of FIGURE 2. Since the rate of voltage increase on capacitor C-3 is determined by the magnitude of the collectro current from transistor Q-4, the length of time required from the beginning of each half cycle for capacitor C-3 to attain a voltage sufficient to cause unijunction transistor Q-3 to break down is also dependent upon the charging current magnitude. To increase the intensity of lamp load 16, the D.C. input voltage is set at a higher magnitude so that a larger charging current will be provided to cause capacitor C-3 to attain the required voltage level to actuate unijunction transistor Q-3 earlier in each half cycle, and thus caused the controlled rectifiers Q-1 and Q-2 to conduct for a greater portion of the respective half cycles.

As unijunction transistor Q-3 fires to dump the charge on capacitor C-3 through the primary 30 of transformer T-2, the transformer, because of its inductive character, will cause a negative voltage to appear across capacitor C-3. This is undesirable, since this negative voltage may still exist at the beginning of the next half cycle and cause erratic firing of the controlled rectifiers at the wrong times. In other words, the negative charge on the capacitor would have to be eliminated at the beginning of the next half cycle before a positive voltage build-up could begin, and thus the trigger pulse would be generated at proportionately later time in the following half cycle. This is further aggravated over a period of several cycles. To eliminate this problem, a blocking diode D-9 is connected across capacitor C-3, with the cathode thereof connected to the positive voltage side of the capacitor, which diode acts to block current flow therethrough when capacitor C-3 is being positively charged but which shunts capacitor C-3 when a negative voltage is applied to the capacitor.

The importance of the charge on capacitor C-3 being exactly zero at the beginning of each half cycle of the alternating current source has been discussed. Only in this way can an accurate control be provided for firing the controlled rectifiers at exactly the desired time during the respective half cycles of the alternating current source. Once unijunction transistor Q-3 has fired during a particular half cycle, transistor Q-4 would continue to supply charging current to capacitor C-3, and should this charging current magnitude be large enough, capacitor C-3 would again cause the firing of unijunction transistor Q-3. Obviously, the repeat firing during the remainder of the half cycle of the unijunction transistor is unnecessary, since once the semiconductor controlled rectifier in the power circuit has been triggered, it will remain in the low impedance, conducting state until the end of that half cycle. The undesirable feature of this is that a residual charge will be left on charging capacitor C-3 at the end of the half cycle, such as would be the case when the unijunction transistor repeated firing and a charge was left on the capacitor of insufficient value to fire it again at the end of the cycle. Thus at the beginning of the next half cycle, the charge will not be zero, and the other controlled rectifier would be fired at a different time during the next half cycle. To eliminate this, the invention provides a clamping means to prevent the charging of capacitor C-3 once it has caused unijunction transistor Q-3 to fire during a particular half cycle. To provide this function, another semiconductor controlled rectifier Q-5 is connected at its anode to the positive side of the rectifier bridge and at its cathode to the reference voltage side of the full wave bridge. The gate of device Q-5 is connected to the lower voltage base of the uniqunction transistor through resistor R-3. As the unijunction transistor Q-3 fires to dump the charge on capacitor C-3, it also applies this voltage pulse to the gate of controlled rectifier Q-5 to switch it to its low impedance state. Consequently, the output voltage from the full wave bridge is shorted out to remove the supply voltage from transistor Q-4 to eliminate the possibility of any charging current being supplied thereafter to capacitor C-3 from transistor Q-4. Since the controlled rectifier Q-5 is also powered in phase with the alternating current source, and since the voltage of the full wave bridge collapses to zero at the end of each half cycle, controlled rectifier Q-5 will be reswitched to its high impedance state at the end of each half cycle to reestablish the supply voltage on charging transistor Q-4. Resistor R-2 limits the current in the secondary of transformer T-3 to prevent it from burning up when the output voltage of the bridge is shorted. During the conduction of rectifier Q-5, diode D-6 acts to block any current during discharge from capacitor C-3 from passing through rectifier Q-5, thus causing capacitor C-3 to completely discharge only through primary 30 of transformer T-2.

When the D.C. control voltage is set at zero, the lamps should likewise be cut off. This would normally be the case were it not for the particular biasing means required for transistor Q-4 to provide "tracking," wherein transistor Q-4 conducts in such a fashion that the intensity of the lamp load varies as a square function of the D.C. input control voltage. To provide this "tracking," a biasing network is provided which comprises resistors R-5, R-6, R-8 and R-9. Resistors R-5 and R-6 are connected in series and provide a path for bias current from the positive side of the bridge to the base of transistor Q-4. Resistors R-8 and R-9 are connected in series and provide a path for bias current from the negative side of the bridge to the base of transistor Q-4. Thus regardless of the D.C. input voltage to the base of transistor Q-4, a bias will be applied to the base of the transistor to cause it to conduct, even through this conduction is slight. The values of resistors R-8 and R-9 are determined experimentally or empirically to provide a bias and conduction path which cooperates with the D.C. input voltage to cause the lamp intensity to vary according to the voltage set a zero, there is still some slight conduction desired "tracking" function. Resistor R–9 is variable for the purpose of fine adjustment. Thus with the D.C. input by transistor Q–4 which causes capacitor C–3 to charge. This charge will build up over a period of several cycles to a magnitude sufficient to fire the unijunction transistor Q–3 and cause the lamps to flicker, which is undesirable. It will be recalled that the first clamping means comprising semiconductor controlled rectifier Q–5 prevents the conduction of transistor Q–4 only after the unijunction Q–3 has fired during a particular half cycle. The problem now is to prevent the conduction of transistor Q–4 when the D.C. input voltage is zero. In this case, voltage from the isolation transformer is still being supplied to the transistor Q–4.

Another clamping means is provided to eliminate the conduction of transistor Q–4 when the D.C. input voltage is set to zero, and comprises another transistor Q–7 connected at its collector to the positive voltage side of the rectifier bridge through diode D–6 and at its emitter to the base of transistor Q–4. The base of transistor Q–7 is connected directly to the cathode of diode D–8, which is also connected to the negative side of the D.C. input voltage through resistor R–7. When a negative D.C. input voltage is applied, diode D–8 is forward biased to conduction so that a bias is applied to transistor Q–4 to cause it to conduct. Forward biasing diode D–8 by applying D.C. input voltage also provides a reverse bias on transistor Q–7 and prevents conduction of this transistor, which allows transistor Q–4 to conduct. When the D.C. voltage is removed, the reverse bias on transistor Q–7 is removed and allows it to conduct, since it is biased to conduction by resistor R–14. Thus the collector to emitter of transistor Q–7 becomes a short circuit and shunts out any base drive that would be applied to transistor Q–4.

Should the operator intend to completely cut off the D.C. input voltage but inadvertently does not cut it entirely to zero, transistor Q–4 will conduct very slightly to charge capacitor C–3. Although this will also require several cycles in order to attain the firing voltage of unijunction transistor Q–3, the lights will flicker when this happens. To preclude this, means are provided for positively discharging capacitor C–3 at the end of each half cycle, so that there will be no charge left at the beginning of the next half cycle. Discharging of the capacitor right at the end of each half cycle does not cause significant power to be supplied to the load, however, since the anode-cathode voltage of the controlled rectifiers Q–1 and Q–2 is reduced to nearly zero at this time. To effect this positive discharge, a voltage dividing network is provided comprising resistors R–10 and R–11 connected in parallel between the positive and reference sides of the full wave bridge. Another resistor of high value is connected between the interconnection of resistors R–10 and R–11 and the positive voltage side of capacitor C–3. Resistors R–10 and R–11 divide the voltage down to about 6 volts assuming the full wave bridge output is about 20 volts. All of the resistors are so selected in magnitude that capacitor C–3 is charged to a voltage just below that required to fire the unijunction transistor at the end of each half cycle with the full 20 volts being applied to this transistor. It is well known that a unijunction transistor will break down at a voltage applied to the emitter which is proportional to the voltage across the two base electrodes, with a higher emitter voltage being required for a higher base-base voltage. At the end of each half cycle, the rectifier output voltage impressed across the unijunction transistor will decrease as shown in the graphical representation of FIGURE 2. As this voltage decreases, it will reach a level at which the voltage on capacitor C–3 is sufficient to cause the unijunction transistor to breakdown, which is a smaller voltage than required when causing it to break down intermediate in the half cycle. If the capacitor is charged to a voltage sufficient to cause breakdown at this higher level, then the capacitor would be discharged before the end of the half cycle if there is an initial charge on it at the beginning of the half cycle, and thus result in flickering of the lights and the establishing of an initial charge on the capacitor at the beginning of the next half cycle. Thus resistors R–10, R–11 and R–12 are of such values to charge the capacitor to a lower voltage, whereby it is discharged only in response to the voltage being decreased across the base terminals of the unijunction transistor, which occurs right at the end of each half cycle. Because resistor R–12 is sufficiently large in magnitude, this resistance network does not appreciably affect the "tracking" of the circuit when Q–4 is made to conduct. The reason for this is that the current supplied through resistor R–12 is small as compared to the charging current normally used.

Reference is now made to diode D–7 connected in the biasing circuit of transistor Q–4 between the base and emitter thereof. This diode provides temperature compensation for the circuit to eliminate any possibility of the lamps varying in intensity as the ambient temperature within which control circuit is situated varies. The fluctuation of the light intensity as a function of ambient temperature fluctuation arises due to the fact that the base-emitter diode voltage drop $V_{BE}$ of transistor Q–4 will vary as a function of temperature. This, of course, causes the degree of conduction of the transistor to vary. By providing diode D–7 in the bias circuit across the base-emitter diode to transistor Q–4, it likewise will vary in voltage drop as a function of temperature. By providing a transistor Q–4 and diode D–7 of the same semiconductor material, such as both being made of silicon, for example, the voltage drop across diode D–7 will change exactly as the voltage drop $V_{BE}$ of transistor Q–4 changes, and thus the conduction of transistor Q–4 is maintained constant regardless of temperature variations. Resistor R–6 is made variable to slightly adjust the gain of transistor Q–4 so that all circuits can be made the same and provide identical "tracking," even though there are slight variations in the transistors' characteristics.

The biasing circuit for transistor Q–4 comprising resistors R–5, R–6, R–8 and R–9 serve to make the control circuit track so that the lamp load will vary in intensity as a square of the percentage D.C. voltage input, all as noted above. This circuit performs very well up to about 75% of the D.C. voltage input; however, as the D.C. control voltage is increased beyond 75% of its maximum value, the lamp intensity tends to increase linearly as a function of increase in control voltage. This linearity of the lamp intensity occurs as the semiconductor controlled rectifiers Q–1 and Q–2 are caused to switch early in the respective half cycles to provide greater power delivery to the load and results from the fact that the firing or switching of the controlled rectifiers is not advanced enough during the first part of the half cycle. That is to say, advancing the firing of the controlled rectifiers over the first part of the half cycles of the sine wave comprising the A.C. power does not represent as great a power change to the load as an equal advancement over the intermediate portions of the half cycles. This is because the slope of the sine wave is greater over the initial part and represents a smaller current. In effect, then, there is an insufficient bias being supplied to the transistor Q–4 during this region. Thus the problem evolves into insuring that a greater bias is applied to transistor Q–4 during the last 25% increase in the control voltage. To effect this, the circuit utilizes a resistor R–D connected in series with a Zener diode D–10, with this combination being connected across biasing resistor R–7 from the control source. Zener diode D–10 is selected to have a predetermined voltage breakdown level and will breakdown or conduct when this level is reached. The particular breakdown level selected for Zener diode D–10 will be such as to cause it to breakdown at the D.C. voltage input where transistor Q–4 will no longer track, which is about 75% of the input D.C. control voltage. Once this voltage is reached, Zener diode breaks down and causes shunting of resistor R-7. This increases the bias on transistor Q-4 by a predetermined amount to cause it to track more accurately. Additional Zener diode-resistor combinations can be provided and hooked in parallel with the first series, as shown in phantom and denoted D-10' and R-D'. This additional Zener will have an even higher breakdown voltage than Zener diode D-10 to make transistor Q-4 track more accurately in the voltage range above that governed by Zener diode D-10. Similarly, additional Zener diode and resistor combinations can be connected in parallel with the others to provide very accurate tracking completely throughout the entire voltage range of the D.C. input voltage. It has been found, however, for most purposes, that only one Zener diode D-10 and resistor R-D combination is sufficient for most applications.

Figure 3:
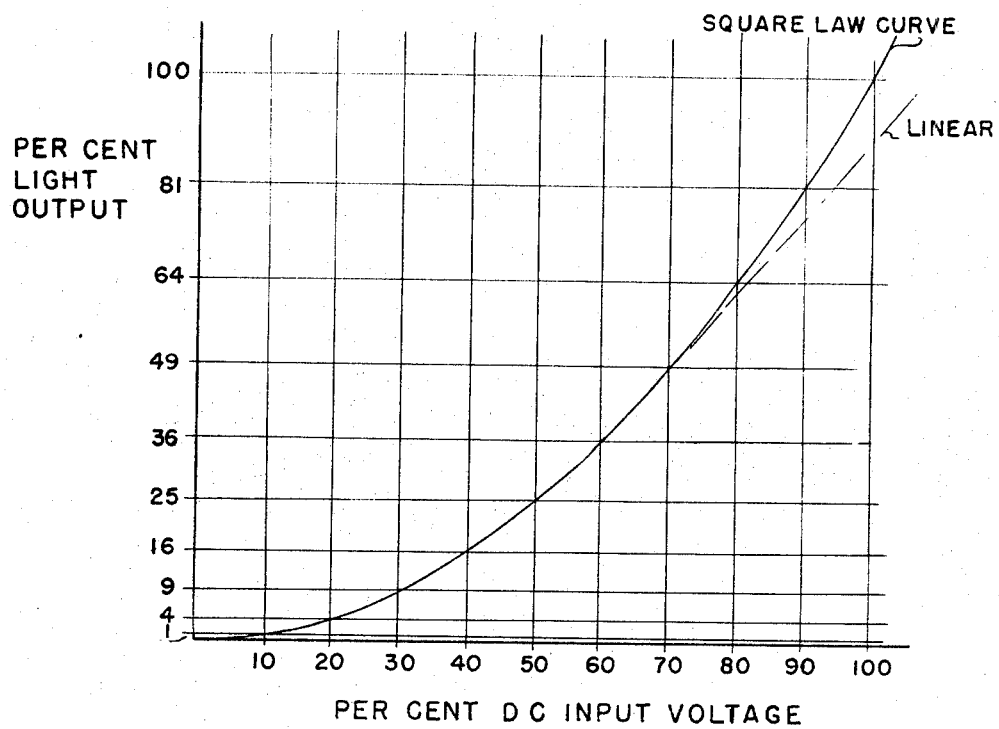
FIGURE 3 is a graphical representation of a square law curve in which the light output intensity varies in proportion to the square of an isolated D.C. control voltage.

The particular light output versus input voltage curve that should be followed is shown in the graphical representation of FIGURE 3, wherein the percent light output is plotted along the ordinate and the percent D.C. input voltage is plotted along the abscissa. At 10% D.C. input voltage, the light output should be 1% of its maximum intensity, at 20%, the light output should be 4% of its maximum intensity, and so forth. It is shown on the graph how a circuit without the Zener diode-resistor combination to provide tracking tends to fall off at the high end of the D.C. input voltage. This occurs at about 75% of the D.C. input voltage and results in a more linear type curve, which is undesirable. However, with the Zener diode-resistor combination connected as shown in the circuit, the true square law curve is very nearly followed, if not exactly met.

The circuit as shown in FIGURE 1 is additionally characterized by an overload and peak current protection function. The overload protection is provided to insure that neither of the semiconductor controlled rectifiers Q-1 or Q-2 are damaged or destroyed due to excessive peak currents passing therethrough. These peak currents can occur upon the accidental overloading of the circuit with too many banks of lamps in the load 16, for example, or when the circuit is first energized to supply power to a bank of lamps whose filaments are cold. It is known that the resistance of cold lamp filaments is only about $\frac{1}{20}$ or so as great as the resistance when heated to incandescence. Thus it is possible to conduct a large inrush current to these lamps through the controlled rectifiers and damage them. Thermisters 18 and 20 can be optionally provided in the circuit to eliminate this problem, but will not serve sufficiently well when there is an overload on the power circuit, or for any other reason, when there is a large peak current generated in the alternating supply source lines.

The invention provides an overload protection means that will phase back the firing of the controlled rectifiers by an amount determined by the peak current passing through the power circuit, which overload protection means will continue to phase back the controlled rectifiers to fire later in the respective half cycles of the alternating current source even to the point of entirely cutting them off, if necessary. This is provided by deriving a voltage from the power circuit through transformer T-1 comprised of a primary current winding 14 and voltage secondary winding 50. The current winding 14 comprises only a single turn of wire of sufficient gage to handle the current and does not present an appreciable impedance thereto. The secondary 50 is a voltage winding and applies a voltage to another full wave bridge comprised of diode D-11, D-12, D-13 and D-14. The voltage developed at the secondary of transformer T-1 will be proportional to the maximum peak current passing through the power circuit. The full wave bridge is simply to charge a capacitor C-5 with the same polarity regardless of the half cycle of the alternating current source. Resistor R-17 and variable resistor R-16 are provided to selectively adjust the voltage to which capacitor C-5 is charged. Thus the voltage to which capacitor C-5 is charged is proportional to the peak current in the power circuit rather than proportional to the RMS value thereof, and it is the peak current value that can cause destruction of the semiconductor controlled rectifiers. A Zener diode D-15 is connected at its cathode to the positive voltage side of capacitor C-5, which Zener diode is selected to have a breakdown voltage of a value that will activate the overload circuit to cut back or phase back the firing of the controlled rectifiers when a maximum safe peak current has been attained. When this voltage is attained, Zener diode D-15 conducts and drives the base of transistor Q-6, the latter of which is connected at the collector to the positive voltage side of the full wave bridge comprising diodes D-1, D-2, D-3 and D-4, through diode D-6, and at the emitter to the base circuit of transistor Q-4. As transistor Q-6 is made to conduct more heavily due to Zener diode conducting more heavily to maintain the same breakdown voltage, more of the driving current that would normally be supplied to transistor Q-4 is shunted through transistor Q-6, and thus the firing angle of the controlled rectifiers Q-1 and Q-2 during the respective half cycles is retarded. With a severe overload or peak current, transistor Q-6 will conduct heavily enough to completely cut off transistor Q-4, and will cut back the conduction of transistor Q-4 accordingly for less severely overloads. Transistor Q-4 is not necessarily needed and is used for amplification only. Should transformer T-1, capacitor C-5 and Zener diode D-15 have sufficient driving power, and indeed they can be made such, the necessity of transistor Q-6 will be obviated.

Although the values of the various components within the circuit just described are not critical and can be varied over reasonably wide ranges, the following examples will indicate values which are suitable for a dimmer operating on 110 v. alternating current used for incandescent lamps. Only some of the values will be given, wherein those that are omitted will be readily apparent to those skilled in the art. At the output of the full wave bridge connected to the secondary of transformer T-3, Zener diode D-5 is selected to have a breakdown voltage of about 20 volts. This means that the full wave rectified voltage applied to the control circuit is very similar to a series of square wave pulses. Unijunction transistor Q-3 is selected to breakdown at an emitter voltage of from about .45 to about .8 of the voltage impressed across the base terminals, which is 20 volts. Thus it will be triggered when capacitor C-3 attains a voltage of about 10 volts. The unijunction transistor triggering voltage is also an approximately linear function of the voltage across the device, so that if the latter is decreased, the triggering voltage is proportionately decreased. Resistors R-10, R-11 and R-12 are chosen so that they, in conjunction with capacitor C-3, have a time constant such that the capacitor is charged to only about 6 volts over a complete half cycle when the D.C. input voltage is set at zero. For this purpose, a capacitor C-3 has, in one example, a value of 0.2 microfarad with resistors R-10, R-11 and R-12 being 6800 ohms, 2700 ohms and 100K ohms, respectively. Thus R-10 and R-11 form a voltage divider with a voltage established therebetween of about 8 volts, so that capacitor C-3 charges to a yet smaller voltage during a complete half cycle. However, as the voltage across the unijunction decays at the end of each half cycle, the unijunction will eventually be triggered positively. Resistor R-12 is also large enough to limit the current flow so that it is small as compared to the collector current from transistor Q-4 when the latter is caused to conduct.

Resistors R-5, R-6, R-8 and R-9 are selected, in one example, to have magnitudes of 10K ohms, 100K ohms, 220K ohms and 100K ohms, which have been found to provide the proper bias range for "tracking." In the same instance, resistor R–13 is selected at about 47K ohms with resistors R–4 and R–7 being about 3.3K ohms and 100K ohms, respectively. All of these values can be used with a maximum D.C. input voltage of 36 volts.

Zener diode D–15 is selected to break down at about 20 volts, so that a voltage on capacitor C–5 of 20 volts represents or is proportional to the maximum safe peak current in the power circuit.

Although the invention has been described with reference to a particular embodiment thereof, there are many substitutions and modifications that do not depart from the true scope of the invention that will become readily apparent to those skilled in the art. It is therefore intended that the invention be limited only as defined in the appended claims.

What is claimed is:

1. A control circuit for controlling electrical power supplied to a load from a source of A.C. voltage comprising:
   (a) first and second switch means, each including a pair of conduction electrodes, each of said switch means normally exhibiting a high impedance state between said conduction electrodes but being switched to a quasi stable low impedance state responsive to a control signal applied thereto and remaining in the low impedance state so long as a minimum amount of current flows through said conduction electrode;
   (b) means for connecting said first switch means by said conduction electrodes in series with the load and the source of A.C. voltage;
   (c) circuit means having an input across which said A.C. voltage can be connected and having an output at which is provided a supply voltage in phase with said A.C. voltage during a first half-cycle of each full cycle said A.C. voltage when the A.C. voltage is connected across the input thereof;
   (d) signal generating means including a capacitor, said signal generating means being effective to generate a control signal responsive to the capacitor charging to a predetermined minimum voltage;
   (e) means for connecting the output of said circuit means to charge said capacitor;
   (f) means for applying the control signal to said first and second switch means at substantially the same instant of time; and
   (g) means connecting the conduction electrodes of said second switch means to shunt the output of said circuit means to preclude further charging of said capacitor the remainder of any half-cycle of the A.C. supply voltage in which said second switch means is switched to the low impedance state.

2. A control circuit according to claim 1 wherein said signal generating means includes current source means connected to said supply voltage and said capacitor and is responsive to said supply voltage to charge said capacitor.

3. A control circuit according to claim 1 wherein said circuit means includes voltage isolation means for electrically isolating said output thereof from said source of A.C. voltage.

4. A control circuit according to claim 1 wherein said first switch means comprises first and second semiconductor controlled rectifiers connected in parallel and in opposite polarities.

5. A control circuit according to claim 1 wherein said signal generating means includes control means for varying the time after the application of said supply voltage thereto at which said capacitor is charged to said predetermined minimum voltage.

6. A control circuit according to claim 1 wherein said circuit means includes rectifier means for producing said supply voltage which is positive only, and said second switch means comprises a semiconductor controlled rectifier.

7. A control circuit for controlling electrical power supplied to a load from a source of A.C. voltage comprising:
   (a) first and second switch means, each including a pair of conduction electrodes, each of said switch means normally exhibiting a high impedance state between said conduction electrodes but being switched to a quasi stable low impedance state responsive to a control signal applied thereto and remaining in the low impedance state so long as a minimum amount of current flows through said conduction electrode;
   (b) means for connecting said first switch means by said conduction electrodes in series with the load and the source of A.C. voltage;
   (c) circuit means having an input across which said A.C. voltage can be connected and having an output at which is provided a supply voltage in phase with said A.C. voltage during a first half-cycle of each full cycle said A.C. voltage when the A.C. voltage is connected across the input thereof;
   (d) signal generating means including a capacitor, said signal generating means being effective to generate a control signal responsive to the capacitor charging to a predetermined minimum voltage;
   (e) means for connecting the output of said circuit means to charge said capacitor;
   (f) means for applying the control signal to said first and second switch means at substantially the same instant of time;
   (g) means connecting the conduction electrodes of said second switch means to shunt the output of said circuit means to preclude further charging of said capacitor the remainder of any half-cycle of the A.C. supply voltage in which said second switch means is switched to the low impedance state;
   (h) said circuit means comprising an isolation transformer having a primary winding and a second winding, said primary winding being adapted for a connection across said source of A.C. voltage, a full wave rectifier bridge connected across the secondary of said transformer, and voltage limiting means connecting across said bridge for providing said supply voltage which comprises a series of substantially constant, positive pulses at twice the frequency of said A.C. voltage and in phase therewith; and
   (i) said first switch means comprising the first and second semi-conductor control rectifiers connected in parallel with opposite polarities and said second switch means comprises a third semi-conductor control rectifier.

8. A control circuit for selectively controlling electrical power to a load from a source of A.C. voltage comprising:
   (a) first switch means having conduction electrodes across which said source of A.C. voltage and said load can be connected, and characterized by a normally high impedance state between said conduction electrodes;
   (b) said first switch means being responsive to a control signal applied thereto for being switched to a low impedance state between said conduction electrodes for applying power to said load from said source of A.C. voltage, and adapted to remain in said low impedance state for as long as a sustaining current flows through said conduction electrodes thereof;
   (c) first circuit means having an input across which said source of A.C. voltage can be connected for providing at an output thereof a repetitive, periodic supply voltage in phase with said A.C. voltage;
   (d) second switch means having conduction electrodes connected to shunt said output of said first circuit means and characterized by a normally high impedance state between the conduction electrodes thereof;
   (e) said second switch means being responsive to a control signal applied thereto for being switched to a low impedance state, to shunt said output of said first circuit means, and adapted to remain in said low impedance state for as long as a sustaining current flows through said conduction electrodes;

(f) signal generating means having an input connected to said output of said first circuit means and having an output connected to said first and said second switch means for generating said control signal applied to said first and said second switch means;

(g) amplifying means having an input and connected between said output of said first circuit means and said signal generating means for conducting a current to said signal generating means at a rate which is a function of the current supplied to said input thereof; and (h) second circuit means having an input across which a selectively variable voltage source can be connected and having an output connected to the input of said amplifier means for supplying said current to said input of said amplifying means which is a function of the magnitude of said selectively variable voltage and for rendering said amplifier means non-conductive when said selectively variable voltage is reduced to zero.

9. A control circuit according to claim 8 wherein said voltage input means includes a first impedance connected in series with said input of said voltage input means and said input of said amplifying means, and a series combination of a second impedance and a threshold voltage conducting device connected in parallel with said first impedance.

10. A control circuit according to claim 9 wherein said threshold voltage conducting device comprises a Zener diode.

11. A control circuit according to claim 8 including biasing means connected to said amplifying means for regulating the conduction thereof in response to variations in the magnitude of said selectively variable voltage to cause the intensity of light from an incandescent lamp load connected across said conduction electrodes of said first switch means to vary as a square of a corresponding linear variation of said selectively variable voltage.

12. A control circuit according to claim 8 including overload current sensing means connecting in series with said first switch means and coupled to said input of said amplifying means for reducing the magnitude of the current applied to the input of said amplifying means as a function of an increase in current conducted through said first switch means.

13. A control circuit according to claim 8 including an overload current sensing means comprising a transformer having a primary comprising a current winding connected in series with first switch means and a secondary comprising a voltage winding, voltage responsive means connected to said secondary for developing a voltage proportional to the peak current conducted by said first switch means, and threshold voltage conducting means coupled between said voltage responsive means and said input of said amplifying means for limiting said voltage developed by said voltage responsive means to a predetermined maximum and for reducing a magnitude of said current applied to the input of said amplifying means as a function of an increase in peak current conducted through said first switch means for peak currents above a predetermined magnitude which correspond to said maximum predetermined voltage at which said voltage responsive means is limited.

14. A control circuit according to claim 13 wherein said voltage responsive means comprises full wave rectifying means connected across said secondary of said transformer and capacitor connected across said rectifying means for being charged to a voltage in response to the current conducted by said rectifying means, and said threshold voltage conducting means comprising a Zener diode.

15. A control circuit for selectively controlling the electrical power supplied to a load from a source of A.C. voltage, comprising:

(a) first and second semiconductor controlled rectifiers each having a pair of conduction electrodes and a gate electrode connected at said pair of conduction electrodes, respectively, in parallel with each other in opposite polarities and across said conduction electrodes said A.C. voltage and said load can be connected, (b) an isolation transformer having a primary across which said source of A.C. voltage can be connected, (c) a full wave rectifier bridge connected across the secondary of said isolation transformer, (d) a third semiconductor controlled rectifier having a pair of conduction electrodes and a gate electrode connected at said pair of conduction electrodes across the output of said rectifier bridge, (e) a unijunction transistor having a pair of base electrodes and an emitter electrode connected at said base electrodes across the output of said rectifier bridge, (f) a capacitor connected between said emitter electrode and one of said base electrodes of said unijunction transistor, (g) amplifying means having a pair of conduction electrodes and a control electrode connected at said pair of conduction electrodes between said rectifier bridge and the interconnection of said unijunction transistor and said capacitor, (h) a voltage transformer connected at the primary thereof to the other of said base electrodes of said unijunction transistor and having a pair of secondaries connected to the gate electrodes of said first and said second semiconductor controlled rectifiers, respectively, (i) means connecting said other of said base electrodes of said unijunction transistor to the gate electrode of said third semiconductor controlled rectifier, and (j) voltage input means having an input across which a source of selectively variable voltage can be connected and connected to the control electrode of said amplifying means.

16. A control circuit for selectively controlling the electrical power supplied to a load from a source of A.C. voltage, comprising:

(a) first and second semiconductor controlled rectifiers each having a pair of conduction electrodes and a gate electrode connected in parallel at said conduction electrodes and across said pair of conduction electrodes said source of A.C. voltage and said load can be connected, (b) an isolation transformer having a primary across which said source of A.C. voltage can be connected, (c) a full wave rectifier bridge connected at the input thereof across the secondary of said isolation transformer for producing a full wave rectified voltage at the output thereof in phase with said A.C. voltage, (d) voltage limiting means connected across the output of said rectifier bridge for clipping said full wave rectified voltage at a predetermined level, (e) a third semiconductor controlled rectifier having anode, cathode and gate electrodes connected at said anode to the positive side of the output of said rectifier bridge and at the cathode to the negative side of said rectifier bridge, (f) a unijunction transistor having a pair of base electrodes and an emitter electrode connected at said pair of base electrodes across said output of said rectifier bridge, (g) a capacitor connected between said emitter electrodes of said unijunction transistor and one output terminal of said rectifier bridge, (h) a transistor having a pair of conduction electrodes and a control electrode connected at said conduction electrodes between one output terminal of said rectifier bridge and the interconnection of said capacitor and said unijunction transistor for charging said capacitor in response to the voltage output of said rectifier bridge at a rate which is a function of the magnitude of the current input to said control electrode thereof, (i) a voltage transformer connected at the primary thereof between the other of said base electrodes of said unijunction transistor and the other terminal of said rectifier bridge and having a pair of secondaries connected to the gate electrodes of said first and said second semiconductor controlled rectifiers, respectively, and (j) voltage input means having an input across which a source of selectively variable voltage can be connected and connected to the control electrode of said transistor means for regulating the conduction of said transistor means and the rate of charging of said capacitor.

17. A control circuit according to claim 16 wherein said voltage input means comprises another transistor having a pair of conduction electrodes and a control electrode connected at said conduction electrodes between said one output terminal of said rectifier bridge and said control electrode of said first mentioned transistor, a diode connected between said controlled electrode of said first mentioned transistor and said another transistor, an impedance connected at one terminal to the interconnection of said diode and said control electrode of said another transistor and connected at the other terminal to the input of said voltage input means, whereby said diode is rendered conductive to bias said additional transistor to non-conduction when the magnitude of said selectively variable voltage is greater than zero and rendered non-conductive when the magnitude of said selectively variable voltage is substantially zero, and said additional transistor is conductive when said diode is rendered non-conductive to bias said first mentioned transistor to non-conduction.

18. A control circuit according to claim 17 including the series combination of a Zener diode and an impedance connected in parallel with said first mentioned impedance, said Zener diode being adapted to conduct only when said selectively variable voltage exceeds a predetermined magnitude.

19. A control circuit for controlling electrical power supplied to a load from a source of A.C. voltage comprising:

(a) first and second switch means, each including a pair of conduction electrodes, each of said switch means normally exhibiting a high impedance state between said conduction electrodes but being switched to a quasi stable low impedance state responsive to a control signal applied thereto and remaining in the low impedance state so long as a minimum amount of current flows through said conduction electrode;

(b) means for connecting said first switch means by said conduction electrodes in series with the load and the source of A.C. voltage;

(c) circuit means having an input across which said A.C. voltage can be connected and having an output at which is provided a supply voltage in phase with said A.C. voltage during a first half-cycle of each full cycle said A.C. voltage when the A.C. voltage is connected across the input thereof;

(d) signal generating means including a capacitor, said signal generating means being effective to generate a control signal responsive to the capacitor charging to a predetermined minimum voltage;

(e) means for connecting the output of said circuit means to charge said capacitor;

(f) means for applying the control signal to said first and second switch means at substantially the same instant of time;

(g) means connecting the conduction electrodes of said second switch means to shunt the output of said circuit means to preclude further charging of said capacitor the remainder of any half-cycle of the A.C. supply voltage in which said second switch means is switched to the low impedance state; and (h) said circuit means including an isolation transformer for electrically isolating the output of the circuit means from the source of A.C. voltage.

20. A control circuit for controlling electrical power supplied to a load from a source of A.C. voltage comprising:

(a) first and second switch means, each including a pair of conduction electrodes, each of said switch means normally exhibiting a high impedance state between said conduction electrodes but being switched to a quasi stable low impedance state responsive to a control signal applied thereto and remaining in the low impedance state so long as a minimum amount of current flows through said conduction electrode;

(b) means for connecting said first switch means by said conduction electrodes in series with the load and the source of A.C. voltage;

(c) circuit means having an input across which said A.C. voltage can be connected and having an output at which is provided a supply voltage in phase with said A.C. voltage during a first half-cycle of each full cycle said A.C. voltage when the A.C. voltage is connected across the input thereof;

(d) signal generating means including a capacitor, said signal generating means being effective to generate a control signal responsive to the capacitor charging to a predetermined minimum voltage;

(e) means for connecting the output of said circuit means to charge said capacitor;

(f) means for applying the control signal to said first and second switch means at substantially the same instant of time;

(g) means connecting the conduction electrodes of said second switch means to shunt the output of said circuit means to preclude further charging of said capacitor the remainder of any half-cycle of the A.C. supply voltage in which said second switch means is switched to the low impedance state; and (h) said circuit means including rectifier means and an isolation transformer, the isolation transformer having a primary for connection across said source of A.C. voltage and a secondary connected to said rectifying means for generating said supply voltage.

21. A control circuit for selectively controlling electrical power supplied to a load from a source of A.C. voltage, comprising:

(a) first switch means having conduction electrodes across which said source of A.C. voltage and said load can be connected, and characterized by a normally high impedance state between said conduction electrodes, (b) said first switch means being responsive to a control signal applied thereto for being switched to a low impedance state between said conduction electrodes for applying power to said load from said source of A.C. voltage, and adapted to remain in said low impedance state for as long as a sustaining current flows through said conduction electrodes thereof, (c) first circuit means having an input across which said source of A.C. voltage can be connected for providing at an output thereof a repetitive, periodic supply voltage in phase with said A.C. voltage, (d) second switch means having conduction electrodes connected to shunt said output of said first circuit means and characterized by a normally high impedance state between the conduction electrodes thereof, (e) said second switch means being responsive to a control signal applied thereto for being switched to a low impedance state, to shunt said output of said first circuit means, and adapted to remain in said low impedance state for as long as the sustaining current flows through said conduction electrodes,
(f) signal generating means having an input connected to said output of said first circuit means and having an output connected to said first and said second switch means,
(g) first amplifying means having an input and connected between said output of said first circuit means and said signal generating means for conducting current to said signal generating means at a rate which is a function of the magnitude of the current supplied to the input thereof,
(h) second amplifying means having an input and connected to said first amplifying means which, when conducting, renders said first amplifying means non-conductive, and
(i) voltage input means having an input across which a selectively variable voltage source can be connected and connected to the input of said first and said second such amplifying means for supplying currents thereto which renders said second amplifying means non-conductive when said selectively variable voltage is set at a magnitude greater than zero and which renders said second amplifying means conductive when said selectively variable voltage is set at a magnitude of zero.

22. A control circuit according to claim 21 wherein said voltage input means includes a unidirectionally conducting device connected to the input of said first amplifying means and between the input and a conduction electrode of said second amplifying means which is conductive to bias said second amplifying means to non-conduction when said selectively variable voltage is set at a magnitude greater than zero, and which is non-conductive when said selectively variable voltage is set at a magnitude of zero.

References Cited

UNITED STATES PATENTS

| 3,283,127 | 11/1966 | Robinson et al. | |
| 3,243,653 | 3/1966 | Locklin | 315—194 |
| 3,299,320 | 1/1967 | Kurata. | |

OTHER REFERENCES

G.E. application note, "The Silicon Controlled Rectifier in Lamp Dimming and Heating Control Service," by Zastrow, p. 7.

JOHN W. HUCKERT, *Primary Examiner.*

J. D. CRAIG, *Assistant Examiner.*